United States Patent

Kerschner et al.

Patent Number: 5,153,161
Date of Patent: Oct. 6, 1992

[54] SYNTHESIS OF MANGANESE OXIDATION CATALYST

[75] Inventors: Judith L. Kerschner, Ridgewood; Lisa DelPizzo, Bloomfield, both of N.J.

[73] Assignee: Lever Brothers Company, Division of Conopco, Inc., New York, N.Y.

[21] Appl. No.: 798,477

[22] Filed: Nov. 26, 1991

[51] Int. Cl.$^5$ .............................................. B01J 31/22
[52] U.S. Cl. .................... 502/167; 502/150; 502/160; 252/186.38; 252/186.39; 252/186.41
[58] Field of Search .............. 502/167, 160, 150; 252/186.38, 186.39, 186.41

[56] References Cited

U.S. PATENT DOCUMENTS

| | | | |
|---|---|---|---|
| 4,450,243 | 2/1984 | Bragg | 502/167 X |
| 4,539,132 | 7/1985 | Oakes | 252/186.38 X |
| 4,626,373 | 12/1986 | Finch et al. | 502/167 X |
| 4,728,455 | 3/1988 | Rerek | 502/150 X |

OTHER PUBLICATIONS

Journal of American Chemical Society, (Wieghardt et al.), 1988, vol. 110, No. 22, p. 7398.
Journal of Chemical Society—Chemical Communications, (Wieghardt et al.) 1988, p. 1145.

*Primary Examiner*—Patrick P. Garvin
*Attorney, Agent, or Firm*—Milton L. Honig

[57] ABSTRACT

A process is described for the preparation of a manganese complex catalyst having the formula:

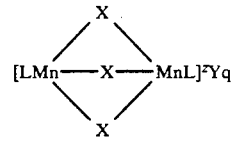

wherein

Mn is manganese in a III or IV oxidation state;
X is independently selected from a coordinating or bridging species selected from the group consisting of: $H_2O$, $O_2^{2-}$, $O^{2-}$, $OH^-$, $HO_2^-$, $SH^-$, $S^{2-}$, $>SO$, $Cl^-$, $N_3^-$, $SCN^-$, $N^{3-}$, $RCOO^-$, $NH_2^-$ and $NR_3$;
R is a radical selected from the group consisting of H, alkyl and aryl radicals;
L is an organic ligand containing at least two nitrogen atoms that coordinate with the Mn;
z is an integer ranging from $-4$ to $+4$;
Y is a monovalent or multivalent counterion leading to charge neutrality; and
q is an integer from 1 to 4;

the process comprising the steps of:

(i) reacting in an aqueous medium a manganese (II) salt with the ligand L to form a manganese coordinated substance, a counterion salt $M_zY_q$ being present wherein M is selected from the group consisting of metals, ammonium and alkanolammonium ions;
(ii) oxidizing the manganese coordinated substance of step (i) with an oxidizing agent;
(iii) basifying a reaction mixture containing the oxidized manganese coordinated substance formed in step (ii) to a pH of at least 10.5; and
(iv) contacting the basified reaction mixture with a further oxidizing agent to form the manganese complex catalyst.

6 Claims, No Drawings

SYNTHESIS OF MANGANESE OXIDATION CATALYST

BACKGROUND OF THE INVENTION

1. Field of the Invention

The invention concerns an improved synthesis of a manganese complex useful as a bleach catalyst.

2. The Related Art

Peroxide bleaching agents for use in laundering have been known for many years. Such agents are effective in removing stains, such as tea, fruit and wine stains, from clothing at or near boiling temperatures. The efficacy of peroxide bleaching agents diminishes sharply at temperatures below 60° C.

It is known that many transition metal ions catalyze the decomposition of $H_2O_2$ and $H_2O_2$-liberating percompounds, such as sodium perborate. It has also been suggested that transition metal salts together with a chelating agent be employed to activate peroxide compounds to render them usable for satisfactory bleaching at lower temperatures. Not all combinations of transition metals with chelating agents are suitable for improving the bleaching performance of peroxide compound bleaches. Many combinations indeed show no effect, or even a worsening effect, on the bleaching performance. A recent advance in this technology was reported in copending U.S. patent application Ser. No. 07/703,554, filed May 21, 1991. Therein was reported a class of highly active bleaching catalysts in the form of a manganese complex having the general formula:

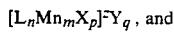

, and especially the species:

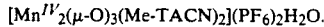

Several of the aforementioned complexes were first synthesized and described by K. Wieghardt in the "Journal of American Chemical Society", 1988, Vol. 110, No. 22, page 7398, as well as in the "Journal of Chemical Society — Chemical Communications", 1985, page 1145.

The synthesis route as described in the above art involves the reaction in aqueous medium of a manganese (III)-compound, e.g. Mn (III)-triacetate, with a proper nitrogen-containing ligand, e.g. 1,4,7-trimethyl-1,4,7-triazacyclononane, using an ethanol/water mixture as the solvent. A drawback of the aforementioned process is that only low yields of the dinuclear Mn (III)-complex can be achieved. Another problem associated with the process of the art is that, owing to the slow crystallization of the product, long reaction times are necessary. Still another problem is that besides crystallization of the desired product, decomposition also seems to occur, yielding manganese dioxide which contaminates the product. Therefore, a purification process is required when the product is to be converted into the dinuclear Mn (IV)-complex.

Accordingly, it is an object of the present invention to provide an improved method for the preparation of manganese (III)- and manganese (IV)-dinuclear complexes.

A more specific object of the present invention is to provide an improved method for preparing dinuclear manganese (III)-complexes of high purity in high yields, which can be converted into the corresponding dinuclear manganese (IV)-complexes by oxidation.

These and other objects of the present invention will become more readily apparent from the detailed description and examples given hereafter.

SUMMARY OF THE INVENTION

A process is described for the preparation of a manganese complex catalyst having the formula:

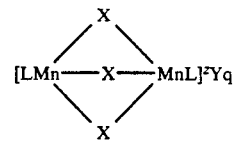

wherein

Mn is manganese in a III or IV oxidation state;

X is independently selected from a coordinating or bridging species selected from the group consisting of: $H_2O$, $O_2^{2-}$, $O^{2-}$, $OH^-$, $HO_2^-$, $SH^-$, $S^{2-}$, $>SO$, $Cl^-$, $N_3^-$, $SCN^-$, $N^{3-}$, $RCOO^-$, $NH_2^-$ and $NR_3$;

R is a radical selected from the group consisting of H, alkyl and aryl radicals;

L is an organic ligand containing at least two nitrogen atoms that coordinate with the Mn;

z is an integer ranging from $-4$ to $+4$;

Y is a monovalent or multivalent counterion leading to charge neutrality; and q is an integer from 1 to 4;

the process comprising the steps of:

(i) reacting in an aqueous medium a manganese (II) salt with the ligand L to form a manganese coordinated substance, a counterion salt $M_zY_q$ being present wherein M is selected from the group consisting of metals, ammonium and alkanolammonium ions;

(ii) oxidizing the manganese coordinated substance of step (i) with an oxidizing agent;

(iii) basifying a reaction mixture containing the oxidized manganese coordinated substance formed in step (ii) to a pH of at least 10.5; and (iv) contacting the basified reaction mixture with a further oxidizing agent to form the manganese complex catalyst.

DETAILED DESCRIPTION

Now it has been found that high yields of dinuclear manganese complexes of relatively high purity can be obtained at a much shorter reaction time and essentially, in a single pot reaction through use of simple manganese (II) inorganic salts.

Accordingly, in its broadest aspect, the invention provides a process for preparation of dinuclear manganese complexes of the formula:

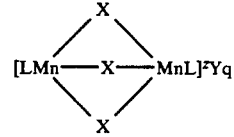

wherein

Mn is manganese in a III or IV oxidation state;

X is independently selected from a coordinating or bridging species selected from the group consisting of: $H_2/1\ O$, $O_2^{2-}$, $O^{2-}$, $OH^-$, $HO_2^-$, $SH^-$, $S^{2-}$, >SO, $Cl^-$, $N_3^-$, $SCN^-$, $N^{3-}$, $RCOO^-$, $NH_2^-$ and $NR_3$;

R is a radical selected from the group consisting of H, alkyl and aryl radicals;

L is an organic ligand containing at least two nitrogen atoms that coordinate with the Mn;

z is an integer ranging from −4 to +4;

Y is a monovalent or multivalent counterion leading to charge neutrality; and q is an integer from 1 to 4.

The counterion Y needed for charge neutrality of the complex is generally provided by carrying out the complexation reaction in the presence of a counterion-forming salt. Though the type of the counterion-forming salt, e.g. chlorides; sulphates; nitrates; methylsulphates; and surfactants such as alkyl sulphates, alkyl sulphonates, alkylbenzene sulphonates, tosylates, trifluoromethyl sulphonates, perchlorates, $NaBH_4$ and $KPF_6$, is not critical for the conversion, some salts are more preferred than others in terms of product properties or safety. For example, small counterions will produce oily liquids and perchlorates are potentially explosive and could become a severe hazard upon large-scale preparation. Preferred counterions are the large molecules from surfactants, especially tosylate. A particularly preferred counterion is $PF_6^-$, which is conveniently obtained from $KPF_6$. Dinuclear manganese (III) and manganese (IV) complexes having $PF_6^-$ as the counterion, are solid crystalline products which are easy to handle and to form into a granulated catalyst product.

Suitable and preferable ligands for use in the present invention are those which coordinate the three nitrogen atoms to one of the manganese centers, preferably being of a macrocylic nature.

The nitrogen atoms can be part of tertiary, secondary or primary amine groups, but also part of aromatic ring systems, e.g. pyridines, pyrazoles, etc. or combinations thereof.

Examples of specific ligands most preferred are those having the structures:

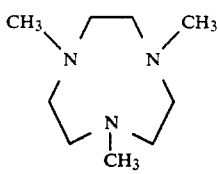  I

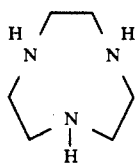  II

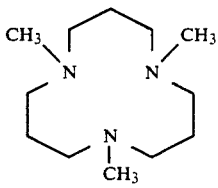  III

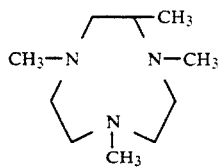  IV

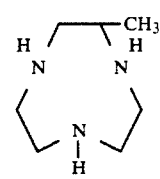  V

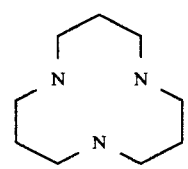  VI

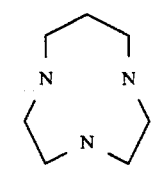  VI

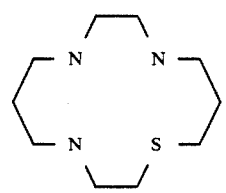  VIII

The most preferred ligands are I-V, with I being particularly preferred.

Ligand (I) is 1,4,7-trimethyl-1,4,7-triazacyclononane, coded as Me-TACN; ligand (II) is 1,4,7-triazacyclononane, coded as TACN; ligand (III) is 1,5,9-trimethyl-1,5,9- triazacyclododecane, coded as Me-TACD; ligand (IV) is 2-methyl-1,4,7-trimethyl-1,4,7-triazacyclononane, coded as Me/Me-TACN; and ligand (V) is 2-methyl-1,4,7-triazacyclononane, coded as Me/TACN.

Any of these complexes, either preformed or formed in situ during the washing process, are useful catalysts for the bleach activation of peroxy compounds over a wide class of stains at lower temperatures in a much more effective way than the Mn-based catalysts of the art hitherto known. Furthermore, these catalysts exhibit a high stability against hydrolysis and oxidation, even in the presence of oxidants such as hypochlorite.

Manganese complexes which are the object of the present synthesis and which are particularly preferred are those with the following structures:

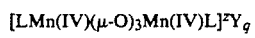

wherein L, Y, q and z are as described above.

Specifically preferred is a compound of the structure:

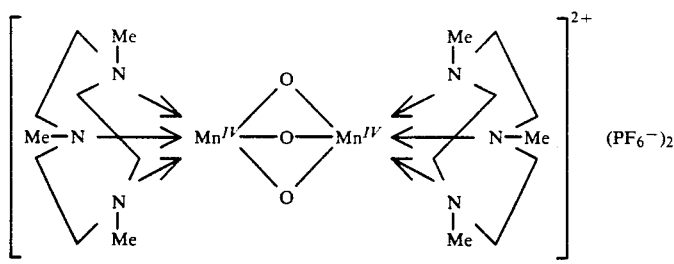

abbreviated as $[Mn^{IV}{}_2(\mu\text{-}O)_3(Me\text{-}TACN)_2](PF_6)_2$.

An important advantage of the process according to the invention is that it can be performed in a single reactor without isolation of any intermediate products as was heretofor required. A first step of the process involves reacting a manganese (II) salt with a ligand L in the presence of a counterion salt $M_zY_q$. Suitable as manganese (II) salts are manganese chloride, manganese sulphate, manganese bromide and manganese nitrate, with the manganese chloride being preferred.

The molar ratio of manganese (II) salt to ligand may range anywhere from 4:1 to 1:2, preferably from about 2:1 to about 1:1, optimally about 1.5:1 to 1:1. Relative molar ratios of the manganese (II) salt to the counterion salt will range from about 4:1 to 1:4, preferably from about 2:1 to about 1:2, optimally between about 1:1 and 1:2. In a separate step of the reaction, a manganese coordinated substance formed in the first step is oxidized. Oxidation can be performed with air, pure oxygen, hydrogen peroxide, potassium permanganate or any combination thereof.

In a third step of the reaction, the reaction mixture from the second step is basified to increase pH to at least 10.5. Suitable basifying agents include alkali metal hydroxides, alkylamines and alkanolamines. Preferred is triethylamine.

In the final step of the reaction, the basified reaction mixtures are contacted with a further oxidizing agent to form the manganese complex catalyst. Suitable oxidizing agents for this step may be air, pure oxygen, hydrogen peroxide and potassium permanganate.

For purposes of this invention, there need be no isolation of any manganese acetate intermediates. In fact, such isolation of a manganese acetate intermediate is disadvantageous. Further, for purposes of this invention it is advantageous to employ a protic solvent system. Particularly useful is a combination of a $C_1$-$C_4$ alkanol and water in a ratio of about 10:1 to 1:10, optimally about 1:1. The preferred alkanol is ethanol.

The following examples will more fully illustrate the embodiments of this invention. All concentrations presented being by weight unless otherwise indicated.

EXAMPLE 1

Synthesis of $Mn(IV)_2MeTACN_2(\mu\text{-}O)_3(PF_6)_2.H_2O$

In a 250 ml round-bottomed flask equipped with a stir bar, $Mn(II)Cl_2$ (0.88 g, 7.0 mmol) and $NaPF_6$ (1.6 g, 9.3 mmol) were dissolved in 25 ml of water followed by addition of ethanol (20 ml). Then the ligand, MeTACN (1.0 g, 5.8 mmol) dissolved in 5 ml of ethanol, was slowly added to the flask forming a light brown precipitate. 3% $H_2O_2$ (1.5 ml, 0.15 eq) was added dropwise to the flask through an addition funnel over 10 minutes forming a brown suspension. Triethylamine (3 ml) was added to the mixture increasing the pH to $\geq 10.5$. The final oxidation was performed by purging $O_2$ through the solution at a rate of 160 ml/min for 3.0 hours. The reaction mixture was then filtered to remove the $MnO_2$ byproduct and rinsed with 85:15 ethanol:water through a frit until the filtrate rinsed clear. The red filtrate was concentrated to one-tenth the volume by rotary evaporation causing precipitation of the red $Mn(IV)$-$_2MeTACN_2(\mu\text{-}O)_3(PF_6)_2.H_2O$. The first crop of crystals were then isolated by filtration. The red solid was dried in vacuo. (yield = 60–65%; purity = 70–75%).

EXAMPLE 2

Determination of Oxidants

Several experiments were run to determine the best oxidant for the oxidation of $Mn(IV)_2(MeTACN)_2(\mu\text{-}O)_3(PF_6)_2.H_2O$. Initially the oxidation was run in air overnight yielding only 18% product. Since air was not a strong enough oxidant, a combination of $H_2O_2$/air was tried. The reaction gave a yield of only 7%. In another experiment a combinaton of air/$O_2$ was attempted and the yield increased to 25%. Further improvements were made when $O_2$ was used as the oxidant for the entire reaction. And finally, the best yields (>60%) were seen when a combination of $H_2O_2$/$O_2$ was used for the oxidation reaction. In this experiment, $H_2O_2$ was initially added to oxidize the $Mn(II)Cl_2$ to the Mn intermediate and $O_2$ was used for the final oxidation to $Mn(IV)_2(MeTACN)_2(\mu\text{-}O)_3(PF_6)_2.H_2O$. The results from these experiments are found in Table I below.

TABLE I

| Oxidizing Agent | | Yield | Reaction Time |
|---|---|---|---|
| First Step | Second Step | | |
| Air | Air | 18% | 18-24 hours |
| $H_2O_2$ | Air | 7% | 18-24 hours |
| Air | $O_2$ | 25% | 18-24 hours |
| $O_2$ | $O_2$ | 39% | 5 hours |
| Air | $H_2O_2$ | NP | 3 hours |
| $H_2O_2$ | $H_2O_2$ | NP | 3 hours |
| $KMnO_4$ | $KMnO_4$ | 50% | 3 hours |
| $H_2O_2$ | $O_2$ | >60% | 3 hours |

EXAMPLE 3

Determination of Most Effective pH for Oxidation Reaction

The final oxidation step to form the $Mn(IV)_2$-$(MeTACN)_2(\mu\text{-}O)_3(PF_6)_2.H_2O$ complex must be performed in a basic solution. Several experiments were run to determine the most effective pH for the oxidation reaction. The results from these experiments show that there is virtually no conversion to the product at either pH 8 or 9. At pH 10 there is some conversion. The best purity and yields were obtained when the reaction was performed at pH $\geq$ 10.5 Table II below shows the results of these experiments.

TABLE II

| pH | ET₃N | Yield at Various PH's 10% NaOH | Purity | Yield |
|---|---|---|---|---|
| 8 | 5 drops | 0 | 5% | 4% |
| 9 | Approx. 1 ml | 0 | — | None |
| 10 | 1-2 ml | 0 | 31% | 45% |
| 10.5 | 5 ml | 0 | 70-75% | 60-65% |
| 11.0 | 3 ml | 1-2 ml | 60-70% | 60-65% |

EXAMPLE 4

Determination of Reactivity with Various Mn(II) Salts

The following reactions were performed on a 1.0 g scale via the experimental conditions shown under Example 1. Different Mn(II) salts were utilized to synthesize $Mn(IV)_2(MeTACN)_2(\mu-O)_3(PF_6)_2 \cdot H_2O$ and Table III lists the results of these syntheses comparing yield and purity of the final product isolated.

TABLE III

| Mn(II) Salt | Purity | Yield |
|---|---|---|
| $MnCl_2$ | 72% | 65% |
| $MnSO_4 \cdot H_2O$ | 58% | 33% |
| $MnBr_2$ | 70% | 55% |
| $Mn(NO_3)_2$ | 53% | 29% |

The foregoing description and examples illustrate selected embodiments of the present invention. In light thereof, various modifications will be suggested to one skilled in the art, all of which are within the spirit and purview of this invention.

What is claimed in:

1. A process for the preparation of a manganese complex catalyst having the formula:

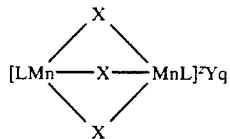

wherein

Mn is manganese in a III or IV oxidation state;

X is independently selected from a coordinating or bridging species selected from the group consisting of: $H_2O$, $O_2^{2-}$, $O^{2-}$, $OH^-$, $HO_2^-$, $SH^-$, $S^{2-}$, $>SO$, $Cl^-$, $N_3^-$, $SCN^-$, $N^{3-}$, $RCOO^-$, $NH_2^-$ and $NR_3$;

R is a radical selected from the group consisting of H, alkyl and aryl radicals;

L is an organic ligand containing at least two nitrogen atoms that coordinate with the Mn;

z is an integer ranging from $-4$ to $+4$;

Y is a monovalent or multivalent counterion leading to charge neutrality; and q is an integer from 1 to 4;

the process comprising the steps of:

(i) reacting in an aqueous medium a manganese (II) salt with the ligand L to form a manganese coordinated substance, a counterion salt $M_zY_q$ being present wherein M is selected from the group consisting of metals, ammonium and alkanolammonium (ii) oxidizing the manganese coordinated substance of step (i) with an oxidizing agent;

(iii) basifying a reaction mixture containing the oxidized manganese coordinated substance formed in step (ii) to a pH of at least 10.5; and (iv) contacting the basified reaction mixture with a further oxidizing agent to form the manganese complex catalyst.

2. A method according to claim 1 wherein the oxidizing agent is selected from the group consisting of air, pure oxygen, hydrogen peroxide, potassium permanganate and combinations thereof.

3. A method according to claim 2 wherein the oxidizing agents of steps (ii) and (iv) are respectively hydrogen peroxide and pure oxygen.

4. A method according to claim 1 wherein basification is achieved with an alkyl amine.

5. A method according to claim 1 wherein the manganese complex has the formula $[LMn(IV)(\mu-O)_3Mn(IV)L]^zY_q$.

6. A method according to claim 1 wherein the manganese complex has the formula $[Mn^{IV}_2(\mu-O)_3(MeTACN)_2](PF_6)_2$.

* * * * *